(12) United States Patent
Harris

(10) Patent No.: US 6,866,176 B2
(45) Date of Patent: Mar. 15, 2005

(54) WEB TENSION EQUALIZING ROLL AND TRACKING APPARATUS

(76) Inventor: Jack C. Harris, 1545 Russell Cave Rd., Lexington, KY (US) 40505

( * ) Notice: Subject to any disclaimer, the term of this patent is extended or adjusted under 35 U.S.C. 154(b) by 0 days.

(21) Appl. No.: 09/950,494

(22) Filed: Sep. 11, 2001

(65) Prior Publication Data
US 2003/0047580 A1 Mar. 13, 2003

(51) Int. Cl.[7] ............................ B65H 26/00; B65H 57/28
(52) U.S. Cl. ........................................ 226/23; 242/615.1
(58) Field of Search ................... 226/21, 23; 242/615.1

(56) References Cited

U.S. PATENT DOCUMENTS

| | | | | |
|---|---|---|---|---|
| 296,222 A | * | 4/1884 | Schubiger ..................... 226/23 |
| 2,655,251 A | * | 10/1953 | Bankauf ....................... 198/806 |
| 2,655,252 A | * | 10/1953 | Spurgeon ..................... 198/806 |
| 3,407,673 A | * | 10/1968 | Slezak .......................... 226/23 |
| 3,776,442 A | * | 12/1973 | Ridley ...................... 242/615.1 |
| 4,641,770 A | * | 2/1987 | Hediger ........................ 226/23 |
| 4,893,740 A | * | 1/1990 | Hediger et al. ............... 226/23 |
| 5,276,460 A | * | 1/1994 | Miyajima ..................... 226/21 |
| 5,397,043 A | * | 3/1995 | Blanding ...................... 226/21 |
| 5,659,851 A | * | 8/1997 | Moe et al. ................... 226/174 |

* cited by examiner

Primary Examiner—Michael R. Mansen
(74) Attorney, Agent, or Firm—Sanford J. Piltch, Esq.

(57) ABSTRACT

A self-tracking roller for centering conveyor belts and web materials on conveyor systems having a guide wheel at each end of a centrally pivoting shaft for contacting the belt or web. The self-tracking roller will pivot in the direction of travel of the belt or web along the side contacted and redirect the belt or web to a central or neutral position by the pivoting action of the roller.

3 Claims, 3 Drawing Sheets

WEB TENSION EQUALIZING ROLL AND TRACKING APPARATUS

BACKGROUND OF THE INVENTION

1. Technical Field

This invention relates to surface winding and unwinding of cloth, paper, metal, or plastic webs and the like from web rolls. The present invention utilizes an equalizing roll to be used in manufacturing for providing equal tension across a web, belt, or sheet material during winding and conveying operations such as used in polymer film processing applications, corrugators, paper forming and cutting machines, printing presses, cloth winders and metal winding operations.

2. Background Information

The present invention comprises an equalizing roll which may be used as a stand alone unit or in a tracking apparatus for stabilizing the run of a material web which is being rolled off of or on to a drum, or through a series of rollers. The present invention is designed to provide a method of optimally stabilizing, controlling the tension, controlling the slack, and directing the web, belt, or sheet of material traveling between rolls.

One application is in the drying section of a high speed paper machine where the paper web to be dried meanders over drying cylinders. The equalizing roll of the present invention is also usable in connection with a "transfer foil", i.e., a device for transferring the paper web from the press section to the drying section, such as described in U.S. Pat. No. 4,551,203 [Eskelinen]. The present invention may also be utilized for stabilizing and controlling the tension of a paper web of paper coaters. It is contemplated that the present invention can also be used in the fabric industry; plastics film, sheet, and tape industry; and in the metal film and foil industry. The invention may be used in small diameter, narrow width applications measurable in centimeters or inches or industrial operations wherein the rolls may extend thirty to fifty feet in length, or longer, depending upon the application.

The equalizing roll of the present invention in the paper industry solves the problem of wrinkles and slack being formed in the paper or plastic film web during processing by an apparatus such as described in U.S. Pat. No. 4,441,263 [Vendenpaa]. The present invention provides a means to control the pressure conditions in the area where the paper web runs together with a backing belt on a receiving drying cylinder and across the entire width of the paper web extending across the entire length of the drying cylinder or other such conveyor assembly. As is generally known, air flow transverse to the drying section causes the edges of the paper web to flutter and/or the formation of wrinkles in the paper web. This occasionally causes the paper web to break or a plastic web to be stretched and permanently distorted. A stable, smooth run of the paper web requires the forces resulting from longitudinal tension of the paper web to be equal. The longitudinal tension on the paper web caused by the drying cylinder in combination with a backing belt creates a region in the paper web where the curvature is irregular as viewed across the width of the paper web. In the center, the paper web bows out more heavily than on the edges resulting in stretching and deformation of the web.

Another application of the present invention is in the cloth industry to avoid wrinkling cloth being unwound from rolls or surface winders and unwinders, batchers, cradle let-offs, and the like, as described in U.S. Pat. No. 5,431,358 [Alexander], in the area where the support rolls engage the cloth roll, the cloth roll is indented presenting a shorter cloth roll radius at that point than the radius in the unengaged areas of the roll resulting in the formation of a bulge or bagging down in advance of the support roll. Sometimes the bulge or loose pucker resulting from such bagging down advances entirely about the wound roll causing wrinkling, marking and uneven tension.

Several patents including U.S. Pat. No. 1,738,130 [Cohen], U.S. Pat. No. 3,433,429 [Schnitzspahn] and U.S. Pat. No. 4,026,487 [Ales] describe various efforts made over the years to solve the problem through compressible support roll coverings to match the compressibility of the support or; to the compressibility of the wound web roll. An inflatable support roll and other efforts to solve the problem include uniform or continuously spaced fluting on the support rolls. Such fluting may be skewed or spiraled in respect to the longitudinal axis. A roll having spaced segments is described in U.S. Pat. No. 1,093,913 [Church]. Conversely, U.S. Pat. No. 3,239,163 [Cmiglio] describes uniformly spaced compressible fluting having upper surface areas conforming to the curvature of the flexible roll. Attempts to match or otherwise utilize the relative compressibility of the support rolls in relation to the compressibility of the wound rolls have met with limited success. Fluted rolls having uniform circumferential spacing cause vibration or chattering, and sometimes mark the wound rolls with the pattern of the fluted segments due to the limited areas of support.

The present invention provides an equalizing roll means to equalize the tension of the web as the web material runs over the rolls distributing the lateral forces so that any imbalance of lateral tension will cause the roll to pivot at its center permitting the roll to move forward on the side of least tension until the web tension is equalized across the entire roll.

SUMMARY OF THE INVENTION

A self-tracking roller assembly for re-centering conveyor belts and web materials on conveyor systems. Each self-tracking roller assembly in a series of such assemblies has a tapered guide wheel at each end of a centrally pivoting non-rotating shaft for contacting the belt or web which has strayed from a centered travel path on the conveyor system The self-tracking roller which has one of its tapered guide wheels contacted by the off-center belt or web will pivot in the direction of travel of the belt or web along the side on which the tapered guide wheel was contacted. The pivoted self-tracking roller will redirect the belt or web to its central or neutral position and by so doing return to its neutral or balanced position.

A web tracking and repositioning apparatus is described comprising at least one pivoting conveyor roll which is pivotally and rotatably supported at a central pivot point. The conveyor roll is divided into roller segments spaced laterally apart from each other along a fixed shaft extending through said conveyor roll for coaxially mounting said roller segments. The roller segments are coaxially mounted along the fixed shaft and spaced apart from said fixed shaft by bearing assemblies to allow for free rotation relative to said fixed shaft. The conveyor roll extends laterally outward a predetermined distance and terminates in paired guide means also coaxially mounted about said fixed shaft by bearing assemblies to allow for free rotation relative to said fixed shaft. The paired guide means is capable of accommodating forward and rearward motion of said conveyor roll in the direction and counter-direction of movement of web material passing over said conveyor roll.

The guide means is moveable in response to frictional contact by said web material with one of the paired guide means indicating a lateral shift and misalignment of the web material which exerts a force on the contacted one of the paired guide means moving that guide means forward in the direction of movement of the web material, and moving the other guide means rearward in the counter-direction of movement of the web material. In this manner the conveyor roll is deflectable in forward and rearward directions swiveling in an arcuate motion in a horizontal plane about the central pivot point in accordance with the translational motion of the guide means from a neutral position with the end of the conveyor roll which is pivoted forward steering the misaligned web material away from the end of the conveyor roll and toward the center, repositioning the web material on the conveyor roll in a more central position.

The paired guide means of the web tracking and repositioning apparatus are each comprised of upwardly and outwardly tapering wheels which extend radially outward from the outer ends of the outer shell of the roller segments and contact a track or raceway located below for support of the outer ends of the conveyor roll in a horizontal plane. The guide means also include means for operatively engaging a side edge of said web material and for urging realignment or steering of the web material centrally over the at least one pivoting conveyor roll.

BRIEF DESCRIPTION OF THE DRAWINGS

For the purpose of illustrating the invention, there is shown in the drawings forms which are presently preferred; it being understood, however, that the invention is not limited to the precise arrangements and instrumentalities shown.

DETAILED DESCRIPTION OF THE PREFERRED EMBODIMENTS

Figure 1:
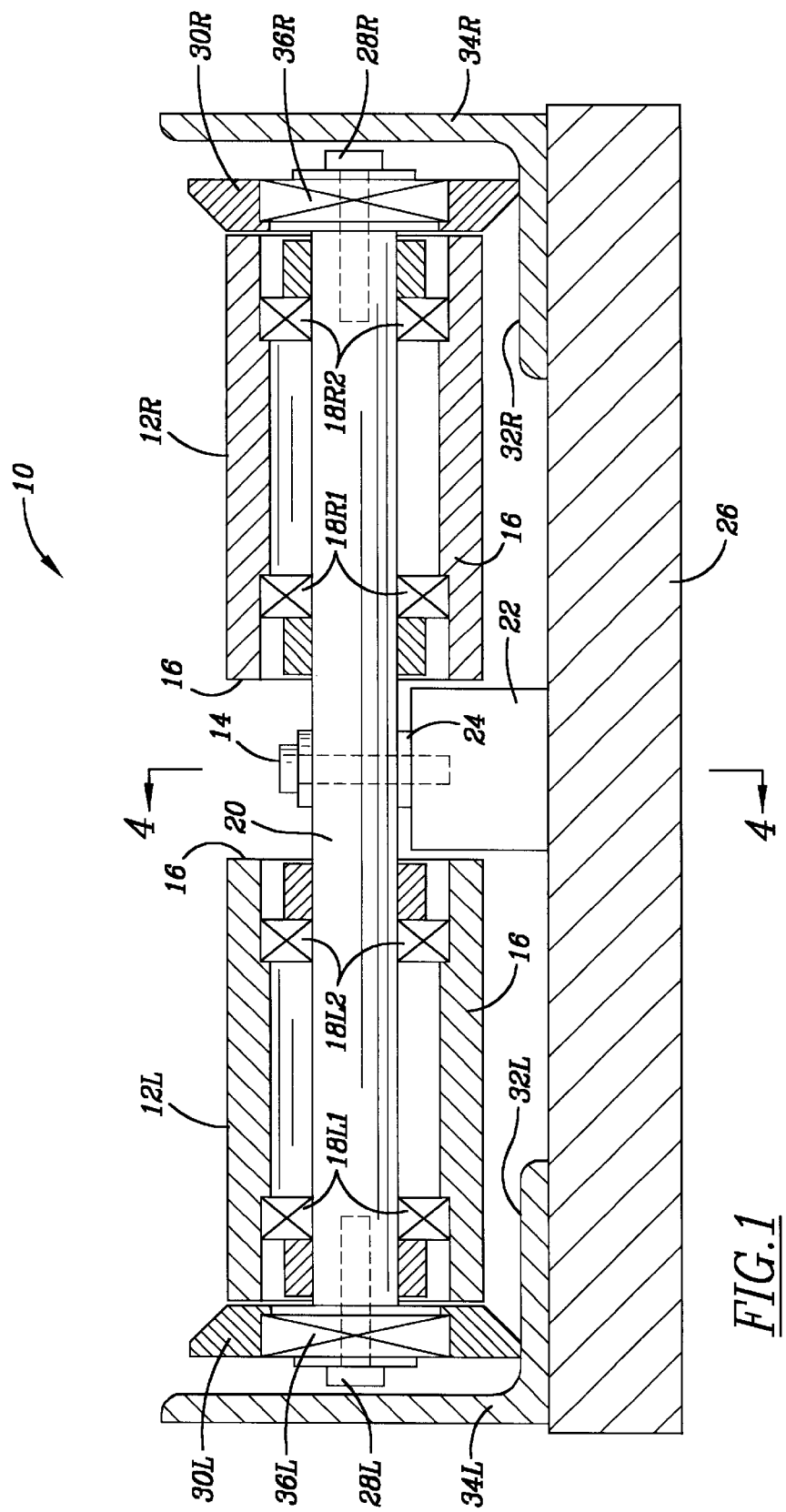
FIG. 1 is a front schematic view of the self-tracking roller assembly of the present invention.

The following detailed description is of the best presently contemplated mode of carrying out the invention. The description is not intended in a limiting sense, and is made solely for the purpose of illustrating the general principles of the invention. The various features and advantages of the present invention may be more readily understood with reference to the following detailed description taken in conjunction with the accompanying drawings Referring now to the drawings in detail, where like numerals refer to like parts or elements, there is shown in FIG. 1 the self-tracking roller assembly 10 of the present invention. This simple, self-contained, entirely mechanical means of tracking, or centering, a conveyed web of material is operable on a conveyor system where the belt, and the web, can travel in both forward and reverse directions. The self-tracking roller assemblies can be accommodated in new conveyor systems or retrofitted in to existing conveyor systems due to their unitary construction.

The self-tracking roller 10 can be described as containing the following inter-related elements. A segregated roller 12L, 12R mounted on either side of a centrally located pivot pin or bolt 14. The segregated roller 12L, 12R is comprised of an outer shell or tube 16 which may be of metal or any composite material exhibiting a sufficient hardness to support the weight of the web. Each shell 16 rotates on a set of paired bearings 18L1, 2 and 18R1, 2 about a common axle shaft 20. The outer shells 16 may be covered or coated with a urethane, rubber or other material to aid in frictional contact between the roller 12L, 12R and the web of material. The outer shells 16 are dimensioned in length to approximate the width of the conveyor system into which the self-tracking roller 10 is to be incorporated.

The outer shells 16 and bearings 18L1, 2 and 18R1, 2 are fixedly positioned onto the axle shaft 20 by compression disks or other known methods to prohibit sideways slip of the shells 16 and bearing assemblies along the axle shaft 20 so as to define a gap or space between the shells 16, defining the segregated roller 12L, 12R. The spacing is maintained to permit the self-tracking roller 10 to be connected to a centrally disposed support rail 22. The connection is accomplished by inserting the pivot pin or bolt 14 through a hole in the axle shaft 20 and inserting the pivot pin or bolt 14 into a corresponding aperture or hole in the support rail 22 such that the pivot pin is maintained in a connected position in the support rail 22 The connection may be a compression fit, cooperating threads of the pivot pin 14 and the hole in the support rail 22, or any other method of retaining the pivot pin 14 in position. To allow a rotation about the pivot pin 14 in the horizontal plane, the axle shaft 20 is supported above the support rail 22 by a washer or spacer 24 such that rotational movement is not restricted through a minimum arc of 15°. The pivot point is the only connection of the self-tracking roller 10 to the support frame 26 which is accomplished by attachment of the support rail 22 to lateral supports of the frame 26 to be described more fully below.

With each self-tracking roller 10 supported at its center, the one or more self-tracking rollers 10 are able to pivot (rotate) about the center support rail 22 in a common plane with the plane of travel of the web material on the conveyor. The support rail 22 is the only inboard support for the axle shaft 20 of the self-tracking roller 10. The support rail 22 has a series of drilled and tapped holes arranged in a predetermined pattern to permit the attachment of the one or more self-tracking rollers 10 of differing dimensional sizes at consistent spacings along the frame. Thusly, the centrally disposed support rail 22 is attached to a series of lateral support members of the frame in order to securely position the rail 22 onto the frame 26.

Figure 4:
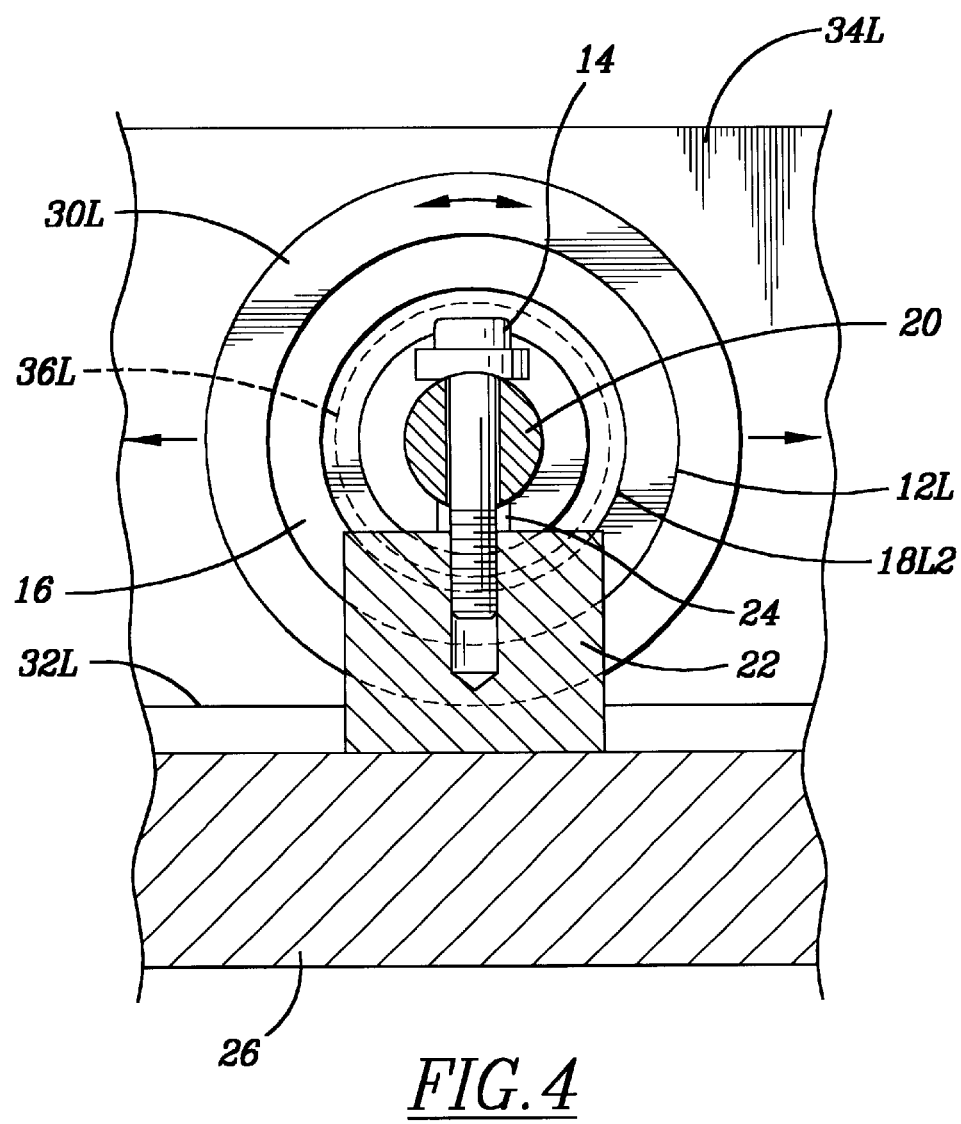
FIG. 4 is a sectional view of the self-tracking roller assembly taken along Line 4—4 of FIG. 1.

Returning to the self-tracking roller 10 as shown in FIGS. 1 and 4, each of the respective outer ends of the axle shaft 20 have drilled and tapped holes for receiving retaining bolts 28L, 28R which hold in position against each of the ends of the axle shaft 20 tapered wheels 30L, 30R for supporting the outboard ends of the self-tracking roller 10 in order to retain the upper surface of the roller 10 in the horizontal plane. The tapered wheels 30L, 30R extend beyond the outer dimension of the shell 16 of the segregated roller 12L, 12R with the wheel taper beginning at a point juxtaposed to the outer end of the segregated roller 12L, 12R and continuing outward at an angle oblique to the horizontal plane of the self-tracking roller 10 and ending in a flattened portion of the wheel having a surface substantially parallel to the outer surface of the shell 16. The flattened portion of the wheels 30L, 30R comes into contact with and rides over a track 32L, 32R which is mounted to the lateral support members of the frame 26 which retains the conveyor assembly, i.e. the self-tracking roller 10, at a predetermined fixed height and location. The track 32L, 32R may be separate or form part of an angle bar 34L, 34R which serves as both the track 32L, 32R and a cover for the rotating tapered wheel 30L, 30R at the outer ends of the self-tracking roller 10. The angle bar 34L, 34R is preferred in the event that the frame 26 of the conveyor assembly does not include siderails for the safety of users.

Each of the tapered wheels 30L, 30R are spaced apart from the shells 16 of the segregated roller 12L, 12R and have only their central sections in proximate contact with the ends of the axle shaft 20. It is the central section of the tapered wheels 30L, 30R which also houses bearing assemblies 36L, 36R. The bearing assemblies 36L, 36R are fitted against the respective ends of the non-rotating axle shaft 20 and held in position by the retaining bolts 28L, 28R and associated oversized washers. Outboard of the bearing assemblies 36L, 36R the tapered wheels 30L, 30R are free to rotate about the axle shaft 20.

The tapered wheels may be manufactured from metal or metal alloy, plastic or other polymer composite which exhibits a high degree of wear tolerance and minimal frictional forces with the track 32L, 32R. Alternatively to the use of the bearing assembly 36L, 36R, each tapered wheel 30L, 30R may freely rotate about the retaining bolts 28L, 28R, but will also need to be made from a material exhibiting minimal frictional forces with the retaining bolts 28L, 28R.

With specific reference to FIG. 4, the tapered wheel 30L is capable of rotating motion in the forward or rearward direction indicated by the two-headed arrow at the top of the wheel. The bottom of the tapered wheel 30L contacts the track 32L of the angle bar 34L so that complete support can be afforded for the outboard end of the self-tracking roller 10. When the self-tracking roller 10 pivots about the pivot pin or bolt 14, the tapered wheel 30L will move forward or backward in relation to the travel direction of the web of material being conveyed as shown by the arrows appearing to either side of the wheel. This motion includes the entire segregated roller 12L with the opposite directional motion imparted to the segregated roller 12R [not shown].

Figure 2:
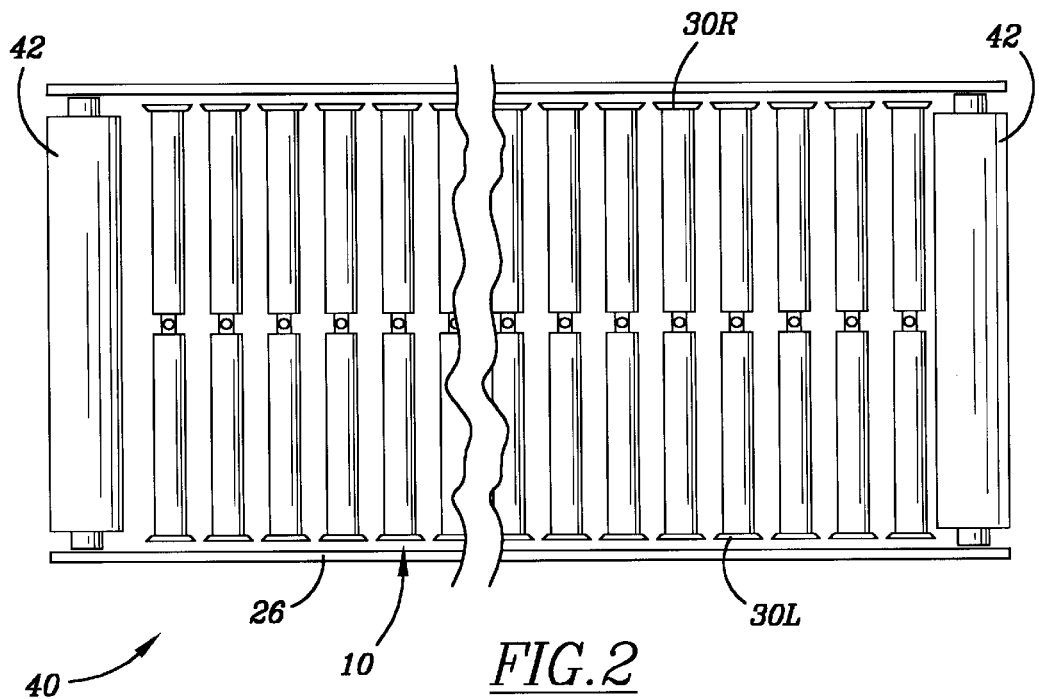
FIG. 2 is a top view of a series of self-tracking and fixed rollers arranged in a web conveyor frame.

Referring to FIG. 2, there is shown a conveyor assembly which is comprised of a series of self-tracking rollers 10 and a conveyor section end roller 42 preceding and following the self-tracking rollers 10. The conveyor rollers 42 have the same lateral dimension as the self-tracking rollers 10 and encompass the width of the conveyor assembly 40. The actual width dimension of the rollers does not include the tapered guide wheels 30L, 30R of each of the self-tracking rollers 10 as the conveyor belt, or the web material, is not intended to touch the tapered guide wheels 30L, 30R if the belt or web travels down the center of the rollers. In this event, the tapered guide wheels 30L, 30R would not be in contact with the belt or web. Since the tapered guide wheels 30L, 30R are not in contact with the belt or web, the self-tracking rollers 10 will be in a neutral or balanced position as shown in FIG. 2. With the conveyor belt or web material moving in a travel direction from left to right, and the belt or web being centered on the rollers, the position of the self-tracking rollers 10 as shown to be neutrally balanced in FIG. 2 will occur.

Figure 3:
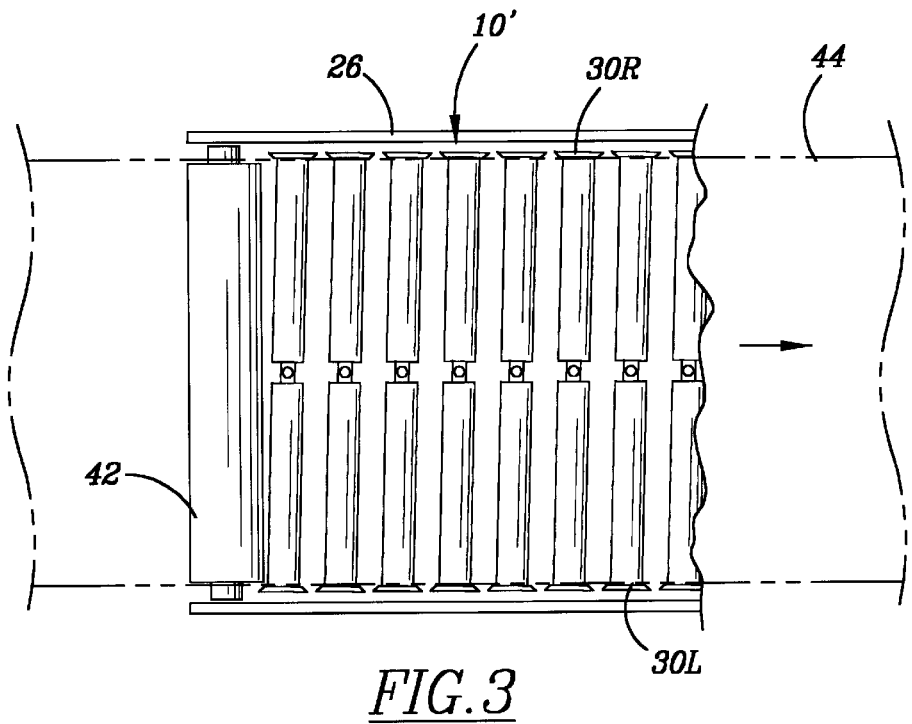
FIG. 3 is a top view of a web of material (in phantom) overlaid on a series of self-tracking rollers showing the web guiding and following aspects of the self-tracking rollers of the present invention.

In the event that the conveyor belt or web material strays from the center and tracks to one side of the rollers, the self-tracking rollers 10 will respond as shown in FIG. 3. The conveyor belt or web material 44, traveling from left to right as shown by the arrow and straying to the left (or downward from center as shown in the drawing), will contact the tapered guide wheels 30L on a successive number of self-tracking rollers 10 which will cause each of the self-tracking rollers 10 to pivot so that the tapered guide wheels 30L move forward in the belt or web travel direction and the tapered guide wheels 30R move rearward away from the travel direction of the belt or web 44 This causes each self-tracking roller 10 to pivot with its right end moving away from the travel direction and its left end moving toward the travel direction of the belt or web 44. The pivoting motion of each self-tracking roller 10, as described above causing the contacted guide wheel 30L to walk forward in the direction of travel of the belt or web 44, will steer the belt or web 44 back toward the center of the conveyor. As the belt or web 44 returns to the center and fewer guide wheels 30L remain in contact with the belt or web 44, the self-tracking rollers 10 will return to a neutral or balanced state with the belt or web 44 traversing the conveyor section along a central guided path.

The present invention may be embodied in other specific forms without departing from the spirit or essential attributes thereof and, accordingly, the described embodiments are to be considered in all respects as being illustrative and not restrictive, with the scope of the invention being indicated by the appended claims, rather than the foregoing detailed description, as indicating the scope of the invention as well as all modifications which may fall within a range of equivalency which are also intended to be embraced therein.

What is claimed is:

1. A web tracking and repositioning apparatus comprising:

at least one pivoting conveyor roll pivotally and rotatably supported at a central pivot point, said pivoting conveyor roll being divided into roller segments;

a fixed shaft extending through said pivoting conveyor roll for coaxially mounting said roller segments;

said roller segments spaced laterally apart from each other along the fixed shaft and being coaxially mounted and spaced apart from said fixed shaft by bearing assemblies to allow for free rotation relative to said fixed shaft;

said pivoting conveyor roll extending laterally outward a predetermined distance and terminating in paired guide means each comprised of upwardly and outwardly tapering wheels which extend radially outward from the outer ends of the outer shell of the roller segments and contact a track or raceway for support of the outer ends of the conveyor roll in a horizontal plane and coaxially mounted about said fixed shaft by bearing assemblies to allow for free rotation relative to said fixed shaft;

said guide means being capable of accommodating forward and rearward motion of said pivoting conveyor roll in the direction and counter-direction of movement of web material passing over said pivoting conveyor roll and includes means for operatively engaging a side edge of said web material for urging realignment or steering of said web material;

said guide means being moveable in response to frictional contact of one edge of said web material with one of said paired guide means indicating a lateral shift and misalignment of said web material which exerts a force on said one of said paired guide means moving said guide means forward in the direction of movement of the web material, and moving said other guide means rearward in the counter-direction of movement of the web material; and said pivoting conveyor roll being deflectable in forward and rearward directions swiveling in an arcuate motion in a horizontal plane about said central pivot point in accordance with the translational motion of said guide means from a neutral position with the end of said pivoting conveyor roll which is pivoted forward steering the misaligned web material away from the end of the pivoting conveyor roll and toward the center repositioning the web material on the pivoting conveyor roll in a more central position.

2. A web tracking and repositioning apparatus comprising:

Two or more pivoting conveyor rolls arrayed sequentially along a bed or frame pivotally and rotatably supported at a central pivot point, each of said two or more pivoting conveyor rolls being divided into roller segments;

a fixed shaft extending through each of said two or more pivoting conveyor rolls for coaxially mounting said roller segments;

said roller segments spaced laterally apart from each other along the fixed shaft and being coaxially mounted and spaced apart from said fixed shaft by bearing assemblies to allow for free rotation relative to said fixed shaft;

said two or more pivoting conveyor rolls each extending laterally outward a predetermined distance and terminating in paired guide means comprised of upwardly and outwardly tapering wheels which extend radially outward from the outer ends of the outer shell of the roller segments and contact a track or raceway for support of the outer ends of the conveyor roll in a horizontal plane and coaxially mounted about said fixed shaft by bearing assemblies to allow for free rotation relative to said fixed shaft;

said guide means being capable of accommodating forward and rearward motion of each of said two or more pivoting conveyor rolls in the direction and counter-direction of movement of web material passing over each of said two or more pivoting conveyor rolls and includes means for operatively engaging a side edge of said web material for urging realignment or steering of said web material;

said guide means being moveable in response to frictional contact of one edge of said web material with one of said paired guide means indicating a lateral shift and misalignment of said web material which exerts a force on said one of said paired guide means moving said guide means forward in the direction of movement of the web material, and moving said other guide means rearward in the counter-direction of movement of the web material; and, each of said two or more pivoting conveyor rolls being deflectable in forward and rearward directions swiveling in an arcuate motion in a horizontal plane about said central pivot point in accordance with the translational motion of its associated guide means from a neutral position with the end of said pivoting conveyor roll which is pivoted forward steering the misaligned web material away from the end of the pivoting conveyor roll and toward the center repositioning he web material on the pivoting conveyor roll in a more central position.

3. A system for self-tracking and repositioning web-like material comprising:

A bed or frame for supporting and carrying a web material;

two or more pivoting conveyor rolls arrayed sequentially along said bed or frame pivotally and rotatably supported at a central pivot point, each of said two or more pivoting conveyor rolls being divided into roller segments;

a fixed shaft extending through each of said two or more pivoting conveyor rolls for coaxially mounting said roller segments;

said roller segments spaced laterally apart from each other along the fixed shaft and being coaxially mounted and spaced apart from said fixed shaft by bearing assemblies to allow for free rotation relative to said fixed shaft;

said two or more pivoting conveyor rolls each extending laterally outward a predetermined distance and terminating in paired guide means comprised of upwardly and outwardly tapering wheels which extend radially outward from the outer ends of the outer shell of the roller segments and contact a track or raceway for support of the outer ends of the conveyor roll in a horizontal plane and coaxially mounted about said fixed shaft by bearing assemblies to allow for free rotation relative to said fixed shaft;

said guide means being capable of accommodating forward and rearward motion of each of said two or more pivoting conveyor rolls in the direction and counter-direction of movement of web material passing over each of said two or more pivoting conveyor rolls and includes means for operatively engaging a side edge of said web material for urging realignment or steering of said web material;

said guide means being moveable in response to frictional contact of one edge of said web material with one of said paired guide means indicating a lateral shift and misalignment of said web material which exerts a force on said one of said paired guide means moving said guide means forward in the direction of movement of the web material, and moving said other guide means rearward in the counter-direction of movement of the web material; and, each of said two or more pivoting conveyor rolls being deflectable in forward and rearward directions swiveling in an arcuate motion in a horizontal plane about said central pivot point in accordance with the translational motion of its associated guide means from a neutral position with the end of said pivoting conveyor roll which is pivoted forward steering the misaligned web material away from the end of the pivoting conveyor roll and toward the center repositioning the web material on the pivoting conveyor roll in a more central position.

* * * * *